W. MATTHEISS.
APPARATUS FOR THE MANUFACTURE OF COMPOUND LARD.
APPLICATION FILED APR. 14, 1910.
993,784.
Patented May 30, 1911.
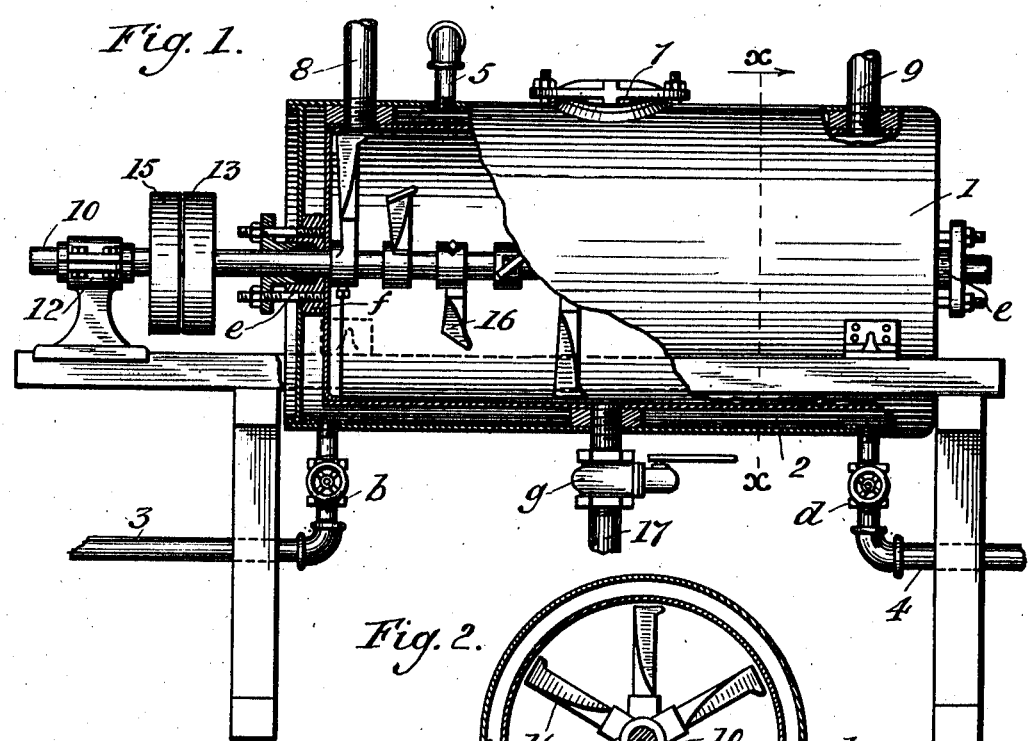
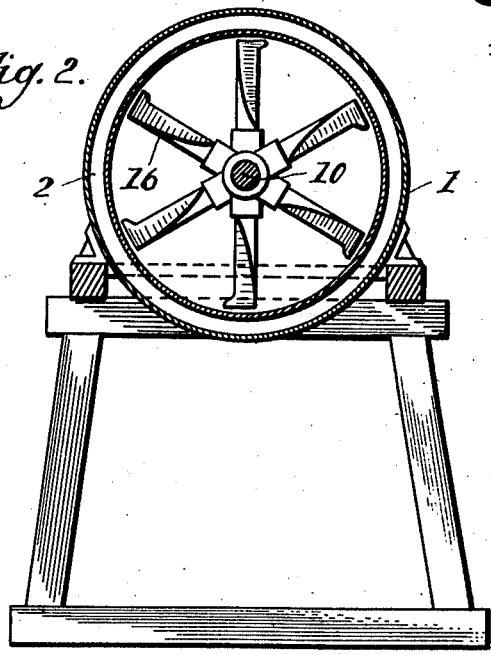
Witnesses
Frank B. Wooden.
Alberta Richards.
Inventor
William Mattheiss,
By G.H. & W.T. Howard,
Attorneys

UNITED STATES PATENT OFFICE.

WILLIAM MATTHEISS, OF BALTIMORE, MARYLAND.

APPARATUS FOR THE MANUFACTURE OF COMPOUND LARD.

993,784.  Specification of Letters Patent.  Patented May 30, 1911.

Application filed April 14, 1910. Serial No. 555,410.

*To all whom it may concern:*

Be it known that I, WILLIAM MATTHEISS, of the city of Baltimore and State of Maryland, have invented certain Improvements in Apparatus for the Manufacture of Compound Lard, of which the following is a specification.

This invention relates to an improved apparatus to be used in the manufacture of what is known to the trade,—as compound lard, that is to say,—an article which is composed of cotton seed oil, and the solid fat as expressed from ordinary fat and properly designated as stearin; and it consists in a peculiar construction of the apparatus hereinafter described.

In Letters Patent No. 980,809 granted to me on the 3rd day of January 1911, I have described a process of manufacturing compound lard of which description the following is an extract:—

"Many efforts have been made to combine cotton seed oil and stearin with the view to produce a body of uniform consistency, but to the best of my knowledge such a result has not been attained prior to my present invention.

"The difficulty met with is the tendency of such dissimilar materials as cotton seed oil and stearin, after being heated, to separate upon cooling, and in such case, the product consists of a loose mechanical mixture of the two ingredients in practically the same condition as they were before the mixing operation, except that the stearin is reduced to small particles which are held in suspension in the oil. This granular condition of the finished product will be produced by sudden refrigeration of the heated compound, but a similar result is found if the compound is allowed to stand undisturbed during a gradual and natural cooling.

"By experiment I have found that when one hundred pounds of cotton seed oil is added to fifteen or twenty pounds of stearin and the mixture heated to the boiling point of water, then stirred for a reasonable time at the same temperature, then gradually reduced in temperature while still being stirred, to between eighty and ninety degrees Fahrenheit, the finished product will resemble pure lard in texture, no granulation being apparent, and this desirable condition is maintained indefinitely."

From the foregoing extract it will be understood that the process is one that has to be carried out, with considerable exactitude; and it follows therefore that to successfully produce the product in accordance with the said process, the apparatus employed must be such as to enable the attendant to regulate the various parts of the process, particularly with respect to temperatures of the materials. I therefore in the present application describe in detail the apparatus which after much experiment, has been found essential to effect the results above set forth.

In the further description of the said invention which follows, reference is made to the accompanying drawing forming a part hereof and in which,—

Figure 1 is a partly sectional side elevation of the improved apparatus, and Fig. 2 a section taken on the dotted line $x$—$x$, Fig. 1.

Referring now to the drawing, 1 is a stationary cylinder having a double wall whereby a continuous space 2 is produced, into which space steam or water, or both conjointly may be introduced. For the purpose of introducing steam into the space 2, I provide the pipe 3 leading from the space 2 of the cylinder to the steam space of a boiler, and govern the flow of steam by means of a suitable valve $b$ in the said pipe. Water is introduced into the bottom of the space 2 through a pipe 4 which is in communication with any source of supply, and which like the pipe 3 is provided with a regulating valve $d$.

In order that the water in the space 2 may not reach any pressure in excess of a column equivalent to the height of the top of the cylinder above the source of water supply, and to admit of the gradual cooling of heated water in the space, effected as and for a purpose hereinafter described, I provide the said space with a continuously open overflow pipe 5 which may lead to a drain.

The cylinder 1 has a man hole with a suitable cover 7, which gives access to its interior for the purpose of cleansing, and is also provided with an open vent pipe 8 to carry off vapor which from any cause may have a tendency to accumulate in the cylinder; and in addition to the pipes just enumerated, I furnish the cylinder with the pipe 9 through which cotton seed oil and melted stearin are separately forced, to be mixed in accordance with the process hereinbefore described.

10 is a rotary shaft which extends longitudinally through the cylinder and is properly packed to prevent leakage. The stuffing boxes which are exterior of the cylinder so as to allow of their being packed without contaminating the contents of the cylinder, are denoted by e, and it will be seen that to properly apply them, the separated inner and outer walls at the ends of the cylinder are united by blocks f, which also constitute portions of the stuffing boxes. The shaft 10 at one end thereof is supported by an exterior bearing 12, and between the said bearing and the adjacent stuffing box, are placed the tight driving pulley 13, and the loose pulley 15. Secured to the rotary shaft 10 are a system of agitating arms or blades 16 which extend preferably in a radial direction and are arranged spirally around the shaft as shown in the drawing.

17 is a pipe leading from the bottom of the cylinder through which the compound lard after the completion of the mixing step of process is drawn, and g a suitable gate valve which when opened admits of the flow of the lard to any suitable receptacle placed beneath it.

In carrying out the process, the space 2 is supplied with water at about the boiling point by the joint introduction of both steam and water, when the cotton seed oil is forced into the cylinder, and afterward the melted stearin at 212 degrees Fahrenheit, or a little higher. The shaft 10 is then put in rotation and the blades 16 acting on the oil and stearin, cause the same to be thoroughly mixed. As soon as the mixing of the oil and stearin is fully accomplished, steam if still turned on, is shut off and cold water alone forced into the space 2, and this is continued until the temperature of the compound lard is gradually reduced to about 80 degrees Fahrenheit, when it is drawn off and allowed to stand in a receptacle undisturbed until it reaches the temperature of the air. When this is done the compound lard is free from granulation, consisting of a body of uniform texture, and this condition will be maintained for an indefinite period without change.

I claim as my invention,—

1. In an apparatus for the purpose described, a closed stationary cylinder having a double wall whereby a surrounding space is formed for the reception of steam and water, the said space having an open and free overflow pipe at its top, an open vent pipe leading upward from the interior of the cylinder, a pipe to conduct steam into the bottom of the space formed by the double wall, a pipe to carry water to the bottom of the said space, a feed pipe for oil and melted stearin leading into the interior of the cylinder, and a discharge pipe for the said materials after the same are mixed, combined with a stuffing box at either end of the cylinder, a rotary shaft which extends entirely through the cylinder and the stuffing boxes of the same and a system of agitating arms or blades which extend radially from the said shaft and are spirally disposed thereon, substantially as specified.

2. In an apparatus for the purpose described, a closed stationary cylinder having a double wall whereby a surrounding space is formed for the reception of steam and water, the said space having an open and free overflow pipe at its top, an open vent pipe leading upward from the interior of the cylinder, a pipe to conduct steam into the bottom of the space formed by the double wall, a pipe to carry water to the bottom of the said space, a feed pipe for oil and melted stearin leading into the interior of the cylinder, and a discharge pipe for the said materials after the same are mixed, combined with an exterior stuffing box at either end of the cylinder, a rotary shaft which extends entirely through the cylinder and the stuffing boxes of the same, and a system of agitating arms or blades which extend radially from the said shaft and are spirally disposed thereon, substantially as specified.

WILLIAM MATTHEISS.

Witnesses:
THOMAS G. HULL,
W. T. HOWARD.